(12) United States Patent
Guidoux et al.

(10) Patent No.: US 11,981,424 B2
(45) Date of Patent: May 14, 2024

(54) TREND MONITORING OF A SHOCK ABSORBER CONDITION

(71) Applicants: Safran Landing Systems UK LTD, Gloucester (GB); Safran Landing Systems, Vélizy-Villacoublay (FR)

(72) Inventors: Antoine Guidoux, Gloucester (GB); Jon Smith, Gloucester (GB); Jean-Yves Ravel, Vélizy-Villacoublay (FR); Yann Simmonneaux, Gloucester (GB)

(73) Assignees: Safran Landing Systems (FR); Safran Landing Systems UK Ltd. (GB)

( * ) Notice: Subject to any disclaimer, the term of this patent is extended or adjusted under 35 U.S.C. 154(b) by 113 days.

(21) Appl. No.: 17/774,925

(22) PCT Filed: Nov. 10, 2020

(86) PCT No.: PCT/EP2020/081659
§ 371 (c)(1),
(2) Date: May 6, 2022

(87) PCT Pub. No.: WO2021/094319
PCT Pub. Date: May 20, 2021

(65) Prior Publication Data
US 2022/0388638 A1    Dec. 8, 2022

(30) Foreign Application Priority Data
Nov. 11, 2019 (EP) ..................................... 19208361

(51) Int. Cl.
*B64C 25/60* (2006.01)
*B64D 45/00* (2006.01)
*B64F 5/60* (2017.01)

(52) U.S. Cl.
CPC .............. *B64C 25/60* (2013.01); *B64D 45/00* (2013.01); *B64F 5/60* (2017.01); *B64D 2045/008* (2013.01); *B64D 2045/0085* (2013.01)

(58) Field of Classification Search
CPC ..... B64F 5/60; B64D 45/00; B64D 2045/008; B64D 2045/0085
(Continued)

(56) References Cited

U.S. PATENT DOCUMENTS 7,716,964 B2    5/2010 Kurtz et al.
9,285,007 B2 *  3/2016 Fazeli .................. G01M 17/04
(Continued)

FOREIGN PATENT DOCUMENTS

EP    3379227 A1    9/2018
FR    2946720 A1    12/2010

OTHER PUBLICATIONS

Extended European Search Report for European Application No. 19208361.6, dated Apr. 28, 2020, 8 pages.
(Continued)

*Primary Examiner* — Kerri L McNally
(74) *Attorney, Agent, or Firm* — Buchanan Ingersoll & Rooney PC

(57) ABSTRACT

A method of monitoring the condition of an aircraft landing gear shock absorber, the shock absorber including at least one spring chamber containing a gas, the method comprising taking a plurality of measurements of the gas pressure and temperature, each gas pressure and temperature measurement pair being taken of at the same instant relative to an operating cycle of the shock absorber; calculating, based on each pair of gas pressure and temperature measurements, a first value; storing the first value in a log; determining a value trend based on the log; and in response to determining
(Continued)

that the value trend is outside a first range of values, generating a first notification signal.

11 Claims, 7 Drawing Sheets

(58) Field of Classification Search
USPC .......................................................... 340/960
See application file for complete search history.

(56) References Cited

U.S. PATENT DOCUMENTS

| | | | | |
|---|---|---|---|---|
| 2012/0053783 | A1* | 3/2012 | Nance ....................... | B64F 5/60 |
| | | | | 701/33.1 |
| 2014/0046533 | A1* | 2/2014 | Nance ....................... | B64F 5/60 |
| | | | | 701/33.7 |
| 2015/0154819 | A1* | 6/2015 | Wilson ................. | G07C 5/0808 |
| | | | | 701/33.2 |
| 2015/0344150 | A1* | 12/2015 | Duncan .................... | B64F 5/60 |
| | | | | 267/195 |
| 2017/0008647 | A1* | 1/2017 | Pountney ............ | G01M 17/007 |
| 2018/0327085 | A1* | 11/2018 | Argiolas ................. | G06F 30/15 |
| 2019/0177009 | A1* | 6/2019 | Brown .................... | F16F 9/435 |
| 2019/0186984 | A1* | 6/2019 | Nance .................. | G01G 19/028 |
| 2019/0270515 | A1* | 9/2019 | Rogiers .................. | B64C 25/60 |

OTHER PUBLICATIONS

International Search Report and Written Opinion for International Application No. PCT/EP2020/081659, dated Jan. 26, 2021, 12 pages.

Canadian Examination Report for Canadian Application No. 3,156,306, dated Jun. 30, 2023, 3 pages.

* cited by examiner

TREND MONITORING OF A SHOCK ABSORBER CONDITION

This application is a U.S. National Phase application of PCT International Application No. PCT/EP2020/081659, filed Nov. 10, 2020, which claims the benefit of EP 19208361.6, filed Nov. 11, 2019, both of which are incorporated by reference herein.

BACKGROUND OF THE INVENTION

Traditionally various types of aircraft utilise landing gear shock absorbers, similar to the ones described in FR2946720 A1, to assist in reducing or damping the stresses experienced during or after an aircraft's landing. These shock absorbers typically feature an oleo-pneumatic strut containing a compressible gas and a hydraulic oil within a damping chamber. Over time, the gas and/or the oil may leak from the shock absorber, which may reduce the ability of the shock absorber to absorb stresses and result in degraded performance of the shock absorber.

Assessing whether a shock absorber performs as expected requires measuring a variety of parameters. In the case of an oleo-pneumatic shock absorber containing a gas and a hydraulic oil, these parameters generally include the gas pressure, hydraulic oil volume, the system temperature and the shock absorber travel (SAT) when the landing gear is supporting the weight of the aircraft.

Currently, these measurements have been simplified to the measurement of the SAT, the aircraft weight and the ambient temperature after the aircraft has experienced a predefined number of flight cycles. If those values fall out of an "acceptable zone" then the shock absorber requires maintenance, resulting in the aircraft being grounded until such maintenance is complete.

The present inventors have recognized that the current methods of monitoring the state of shock absorbers suffer from a variety of flaws, including the need to manually check a variety of parameters and the inability to provide advanced warning for servicing requirements, which may result in aircraft being unexpectedly grounded.

SUMMARY OF THE INVENTION

According to a first aspect of the invention there is provided a method of monitoring the condition of an aircraft landing gear shock absorber, the shock absorber including at least one spring chamber containing a gas, the method comprising taking a plurality of measurements of the gas pressure and temperature, each gas pressure and temperature measurement pair being taken of at the same instant relative to an operating cycle of the shock absorber; calculating based on each pair of gas pressure and temperature measurement a first value; storing the first value in a log; determining a value trend based on the log, the value trend value indicating a prediction of performance of the damping chamber; and in response to determining that the value trend is outside a first range of values, generating a first notification signal.

Thus the inventors have devised a method that enables, while the shock absorber is not in immediate need of maintenance, providing advance warning for servicing requirement so this task can be completed at the preferred moment and preferred location for the airline without unexpectedly having to ground the plane.

According to second aspect of the invention there is provided a method of monitoring the condition of an aircraft landing gear shock absorber, the shock absorber including at least one damping chamber containing a gas, the method comprising: measuring the pressure and temperature of the gas at a predetermined moment in time; calculating a first value based on the measured gas pressure and temperature; determining if the first value is outside a first predetermined range and if so generating a first notification signal.

The method can further comprise determining if the temperature corrected gas pressure or the value trend is outside a second predetermined range, the second predetermined range encompassing the first predetermined range, and if so generating a second notification signal, optionally in place of the first notification signal.

Determining the first value may comprise calculating a temperature-corrected gas pressure.

Determining the first value may comprise calculating a difference based on the measured pressure and an expected pressure.

The first range and/or the second range may be predetermined. Alternatively the first range and/or the second range may be determined based on the temperature measurement.

Measuring the pressure and the temperature of the gas in the spring chamber may occur with the shock absorber being fully extended.

Determining the pressure and temperature of the gas in the spring chamber may occur before the aircraft lands, after the aircraft takes-off or once the aircraft has reached a predetermined altitude, at a predetermined time before landing, in response to extending the landing gear, or at a predetermined flight phase.

The measured values of gas pressure and temperature may be communicated to a computing device outside of an aircraft comprising the aircraft landing gear shock absorber, wherein the computing device calculates the temperature-corrected gas pressure, stores the first value in the log and/or determines the gas pressure trend.

According to another aspect of the invention there is provided a system comprising a shock absorber that comprises a spring chamber, and a sensor configured to measure the temperature and the pressure of a gas in the spring chamber, wherein the sensor can communicate the measurements of temperature and pressure of the gas to a computing device configured to perform the method according to the invention.

BRIEF DESCRIPTION OF THE DRAWINGS

Embodiments of the invention will now be described, by way of non-limiting examples only, with reference to the following accompanying figures, in which.

DETAILED DESCRIPTION OF EMBODIMENTS OF THE INVENTION

Figure 1:
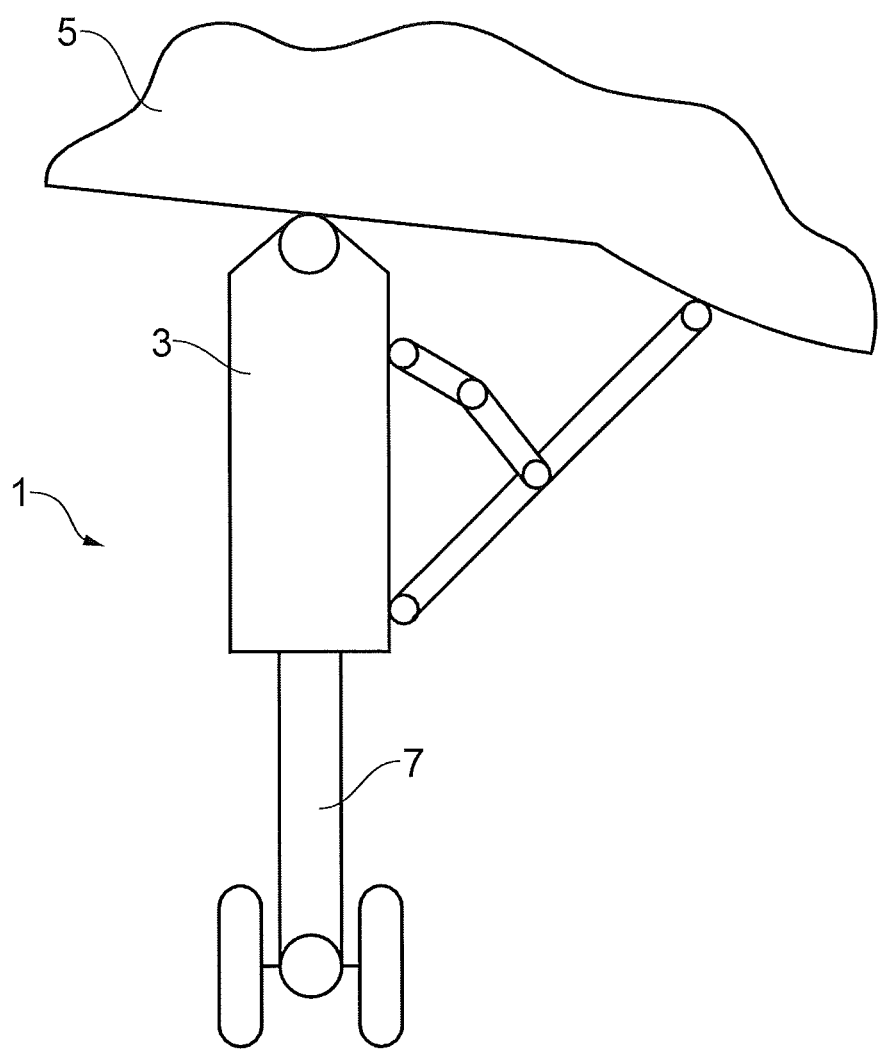
FIG. 1 is a schematic diagram of an aircraft landing gear.

FIG. 1 schematically illustrates a typical aircraft main landing gear 1. The landing gear includes an oleo-pneumatic shock absorber strut having a main housing 3 that is coupled to a portion of the aircraft 5 and a sliding piston 7 partially received within the main housing. The end of the sliding piston not received within the main housing is coupled to the landing gear wheels.

Figure 2:
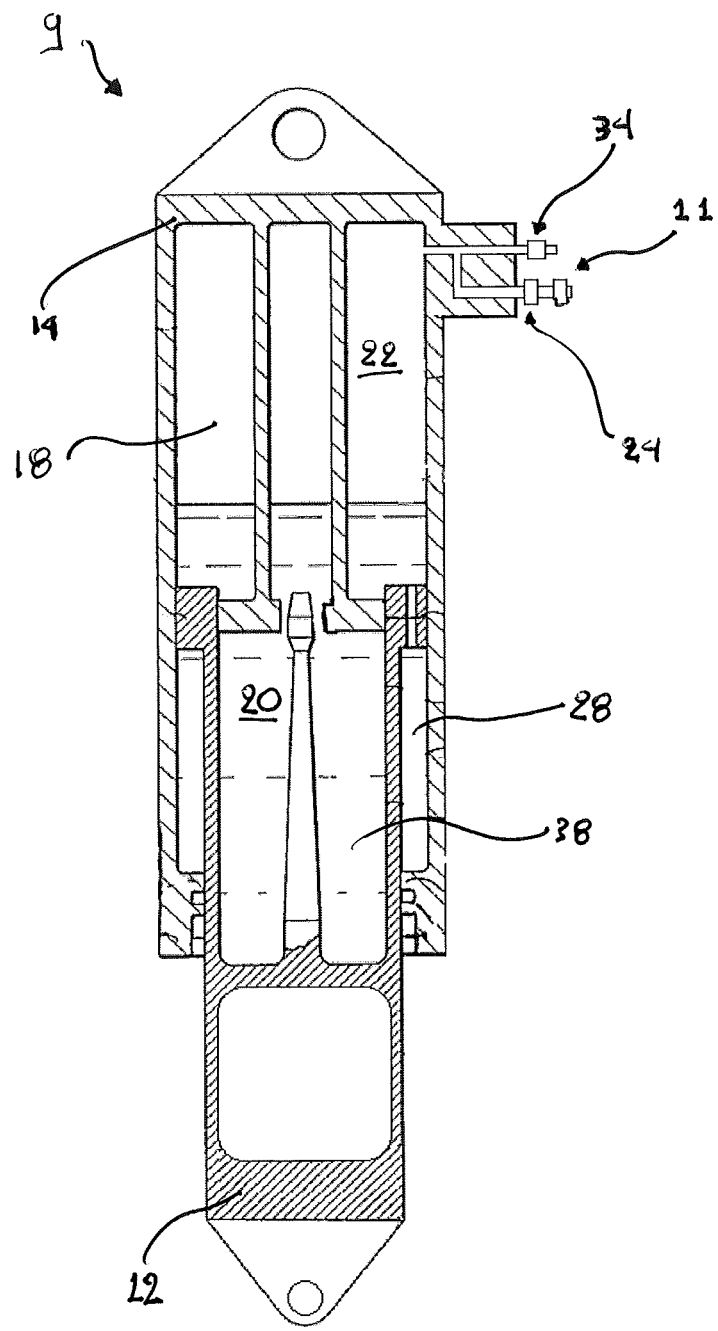
FIG. 2 is a schematic diagram of a shock absorber according to an embodiment of the present invention.

FIG. 2 illustrates a system for monitoring the condition of a landing gear shock absorber according to an embodiment of the present invention. The system includes an oleo-pneumatic shock absorber 9, such as illustrated in FIG. 1, and a sensor 11. The shock absorber includes a sliding piston 12, slidably coupled in an outer, main, housing 14 via bearings 16. The sliding piston 12 and outer housing 14 together define an internal cavity comprising a spring chamber 18, a recoil chamber 28 and a damping chamber 37. In normal operation the spring chamber 18 contains a compressible gas 22 such as nitrogen, while the recoil chamber 28 and the damping chamber 37 contain hydraulic oil 20. A shock absorber inflation valve 31 may be connected through a port to the spring chamber 18 to enable adding gas to the spring chamber 18.

The sensor 11 is configured to measure the pressure and temperature of the gas in the spring chamber 18, for example by inclusion of a pressure transducer (not illustrated) and a temperature probe (not illustrated) or alternatively, by a combined pressure and temperature transducer. Measuring the pressure and temperature of the gas enables an assessment of the shock absorber condition, and therefore its likely ability to perform satisfactorily, by checking if the measured values are in certain predefined ranges. The sensor is connected to the spring chamber 18 through a port and a valve 24. The valve 24 enables replacement of the sensor 11 without any loss of gas pressure that may require further servicing. In other embodiments the sensor can be connected to the spring chamber 18 through the port for the shock absorber inflation valve 31. An advantage of having a sensor directly measuring the gas in the spring chamber 18 is that it offers better accuracy of the pressure reading and allows a temperature measurement of the gas itself (rather than the temperature of the surrounding environment). This accuracy allows a finer definition of the servicing threshold as lower tolerances have to be considered. The proposed system also removes the risk of a loss of gas pressure compared to the use of a portable pressure gauge. In some embodiments the valve may be configured to be kept closed by the pressure within the shock absorber and to be opened by the sensor thus reducing the chance of gas leaking accidentally from the valve.

The sensor 11 is arranged to be communicatively coupled to a computing unit (not illustrated). The computing unit may be housed with the sensor 11 in a single unit or may be separately located elsewhere on the aircraft or located remotely from the aircraft altogether. The sensor 11 is configured to measure the pressure and temperature of the gas in the spring chamber 18 and transmit these paired values of temperature and pressure to the computing unit in response to a predefined condition being satisfied. The sensor 11 is configured to measure the pressure and temperature of the gas in the spring chamber 18 at the same point in each operating cycle of the aircraft landing gear, ensuring a high level of repeatability in the measurement and enabling even tighter tolerances in the definition of predefined performance ranges. The predefined condition being satisfied may be when the shock absorber is fully extended or when the shock absorber is in a state commonly known as "weight off". For example, the measurements of pressure and temperature may be taken when the landing gear is in the stowed position after take-off or preferably before landing as the gas dissolution and temperature will be at their most stable condition. Measuring the pressure and temperature of the gas in the spring chamber 18 when the shock absorber is fully extended avoids the need to monitor the shock absorber travel or compression. The sensor 11 may be configured to measure the pressure and temperature of the gas in the spring chamber 18 when a "gear down" command is activated by the flight crew while the landing gear is in the stowed position. This ensures that the gas/oil mixture is in a stable condition compared to other flight phases and may provide comparable conditions for measuring, for example having an ambient temperature in the same range, no movement of landing gear or shock absorber, and preventing impact on the measurement from the effect on gas dissolved into the oil. Alternatively, the sensor 11 may be configured to measure the pressure and temperature of the gas in the spring chamber 18 after a predetermined period of time has elapsed since the aircraft has taken-off. For example, the sensor 11 may be configured to measure the pressure and temperature of the gas in the spring chamber 18 once the aircraft has reached a predetermined altitude. In some embodiments measuring the pressure and temperature of the gas may occur immediately after the aircraft takes-off or once the aircraft has reached a predetermined altitude after take-off. In some embodiments, measuring the pressure and temperature may occur at a predetermined time before landing, wherein the time of landing is estimated based on the velocity of the aircraft, the speed of the aircraft and the altitude of the aircraft, or other systems commonly used to facilitate landing procedures. In some embodiments, measuring the pressure and temperature may occur in response to extending or deploying the landing gear, or more generally at a predetermined flight phase. Some embodiments of the invention may use a combination of the above conditions as triggers for the sensor 11 to measure the temperature and the pressure of the gas.

In some embodiments either the sensor 11 or the computing unit may include an internal memory that stores the measured values and transmits the measured values after the plane has landed. In some embodiments the measured value may be transmitted to a computing unit while the plane is off the ground.

In the illustrated embodiment of FIG. 2, the shock absorber is an unseparated single stage shock absorber. In other embodiments however, the shock absorber may be a dual or multiple stage shock. In embodiments with multiple spring chambers, each spring chamber may have a respective sensor 11 configured to measure the temperature and the pressure of the gas in the respective spring chamber.

The computing unit may comprise a memory, on which a log may be kept. The log may store measured values of temperature and pressure of the gas 22 in the spring chamber 18. The computing unit processes the pairs of measured values received by the sensor 11 to generate a first value. In this embodiment the first value is a temperature-corrected pressure of the gas. The temperature-corrected pressure of the gas may be calculated by using Gay-Lussac's Law and a predefined reference temperature. In other embodiments of the invention the first value may be the pressure of the gas as measured. The first value is stored in the log. The log may be scrubbed or emptied of values at the end of every servicing of the shock absorber, so that it only contains values measured after the last full servicing of the shock absorber.

The computing unit uses the plurality of the first values stored in the log, or a subset thereof, to generate a set of corresponding trend values, the trend values forming value trend line based on a predefined algorithm or regression analysis. For example, the trend values may be generating by calculating a rolling average of a predetermined number of previous stored first values, or may be generating by performing a curve fitting routine to the stored first values in order to generate the value trend line. The computing unit compares the value trend values with a first range of acceptable or compliant pressure values. In this embodiment the first range is predetermined. If the computing unit determines that the trend values are outside the first range, the first range of values being pressure values that are in an "acceptable in-tolerance" range, a first warning or notification signal is generated. In other embodiments if the computing unit determines that the trend values are outside a second range, the second range encompassing the first range, a second notification signal is generated. In some embodiments, generating the second notification signal stops the generation of the first notification signal, so that only one signal is generated. The first notification signal may indicate that the shock absorber is performing in a sub-optimal but acceptable manner but will soon require servicing. This enables the aircraft operator to have advance warning of servicing requirements so this task can be completed at the preferred time and location. The second notification signal may indicate that the shock absorber is performing in an unsatisfactory manner and requires immediate servicing.

In this embodiment, the predetermined values for the first and second range are derived from the theoretical isothermal spring curve of the shock absorber across the temperature range. In embodiments where the first value is equal to the pressure of the gas as measured, the first range and/or the second range may be temperature-corrected pressure ranges based on predefined reference ranges and the measured temperature of the gas 22. Calculating the temperature-corrected ranges may be based on Gay-Lussac's Law.

In another embodiment of the invention the computing unit compares the determined first value with the first range and/or the second range, i.e without calculating a trend.

If the first value is outside the first range, the first notification signal may be generated. If the first value is outside the second range, the second notification signal may be generated instead of the first notification signal. Similarly to the previously described embodiment, the first notification signal may indicate that the shock absorber may be performing in a satisfactory manner, but will soon require servicing while the second notification signal may indicate that the shock absorber may be performing in an unsatisfactory manner and requires immediate servicing.

In another embodiment of the invention the computer unit generates a value trend as described previously but (before or during the generation of the value trend) also assesses whether the determined first value is outside the second range. In such an embodiment, determining that the first value is outside the second range will cause the computing unit to generate the second notification signal, irrespective of whether the trend value is inside the second range or not.

In some embodiments, the first and/or second ranges against which the trend values are compared may be different to the corresponding first and/or second ranges against which the first value is compared to assess whether a first notification signal or a second notification signal must be generated.

In another embodiment of the invention the computing unit compares the measured pressure of the gas with the expected theoretical value from the isothermal spring curve at the measured gas temperature to determine a difference, or error. This difference between the theoretical optimal value and the measured pressure is then used as the first value and depending on the embodiment can be either stored in the log and used to generate an error trend, or directly assessed against a first range and a second range to assess the health of the shock absorber.

In some embodiments of the invention the first notification signal is communicated only to the ground crew that services the plane, while the second notification signal is communicated both to the flight crew and the ground crew.

Figure 3:
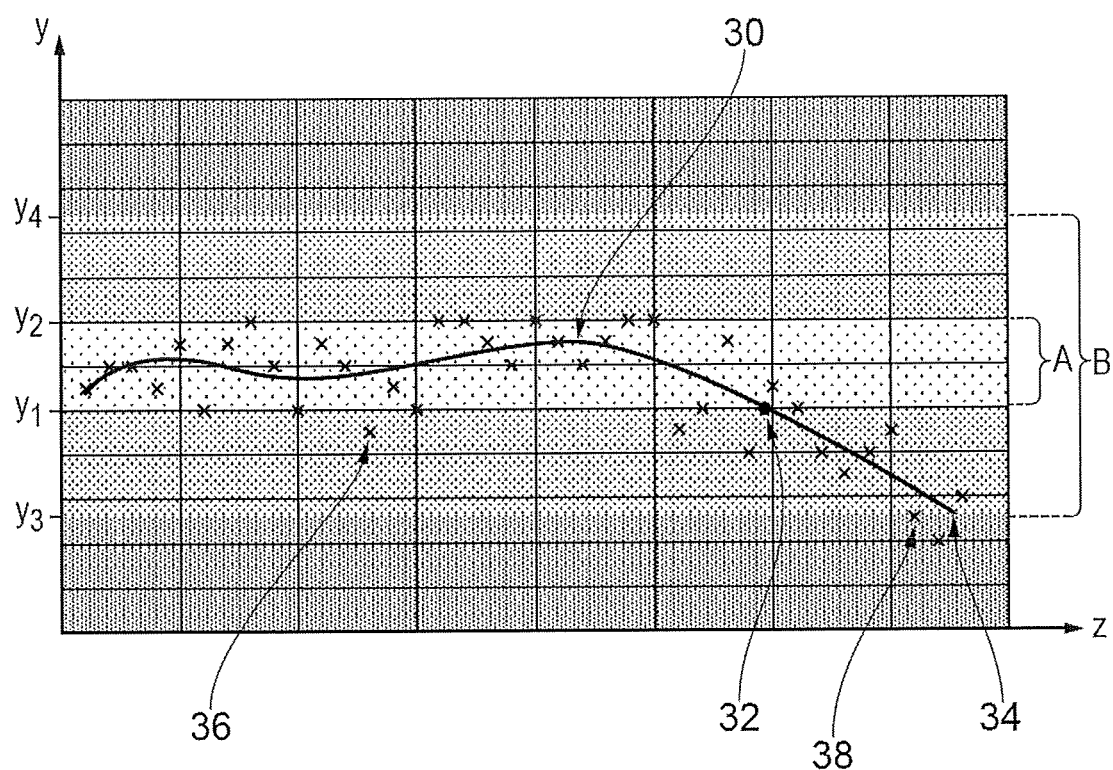
FIG. 3 is a graph of temperature-corrected pressure values vs number of flight cycles.

FIG. 3 illustrates the temperature-corrected pressure of the gas based on measurements of temperature and pressure at every operating cycle of the shock absorber and the trend calculated by the computing unit. In FIG. 3, the z-axis corresponds to the number of flight cycles, while the y-axis denotes the temperature-corrected gas pressure. The X's mark the temperature-corrected gas pressure values calculated by the computing unit based on the measured temperature and pressure of the gas in the spring chamber 18 of the shock absorber 9 for each respective operating cycle of the landing gear. The first range labelled A, bounded by a maximum value y2 and a minimum value of y1, represents gas pressure values that are fully complaint, i.e. expected gas pressure values for a shock absorber with the correct gas pressure & oil volume. The second range labelled B, bounded by a maximum value y4 and a minimum value y3, represents gas pressure values that whilst not within the fully compliant range are within an 'acceptable out-of-tolerance' range for which continued operation of the landing gear and shock absorber is safe and acceptable but which indicated that a full service of the shock absorber will be required in the near future. The trend line 30 is calculated based on a plurality of temperature-controlled pressure values as described previously.

In those embodiments of the invention that calculate a trend to assess whether the first or second warning signal must be generated, point 32 on the trend line 30 indicates the transition of the performance of the shock absorber from the "acceptable" range to the "acceptable out-of-tolerance" range. In response to this transition the first warning signal will be generated, notifying that the shock absorber will soon require servicing. As more measurements are taken the trend line extends further until point 34 where the performance of the shock absorber crosses over from the "acceptable out-of-tolerance" range to the "not-acceptable out-of-tolerance" range, after which the shock absorber is likely to perform unsatisfactorily and servicing is required immediately. Consequently, the shock absorber must be serviced before the next take-off.

In those embodiments of the invention that do not calculate a trend but use the actual temperature-corrected gas pressure value to determine if it is outside of the compliant or acceptable first range or the second range to assess whether the first or second warning signal must be generated, the first warning signal is produced at the operational cycle of point 36, which is the first temperature corrected gas pressure value (since servicing the shock absorber) that is outside of the fully compliant range. Note that the trend line 30 is still within the compliant range at this point. Similarly the first time that the second warning signal is generated is at the operation cycle of point 38, where for the first time since servicing the shock absorber the temperature-corrected pressure is outside of the "acceptable out-of-tolerance" range.

Figure 4:
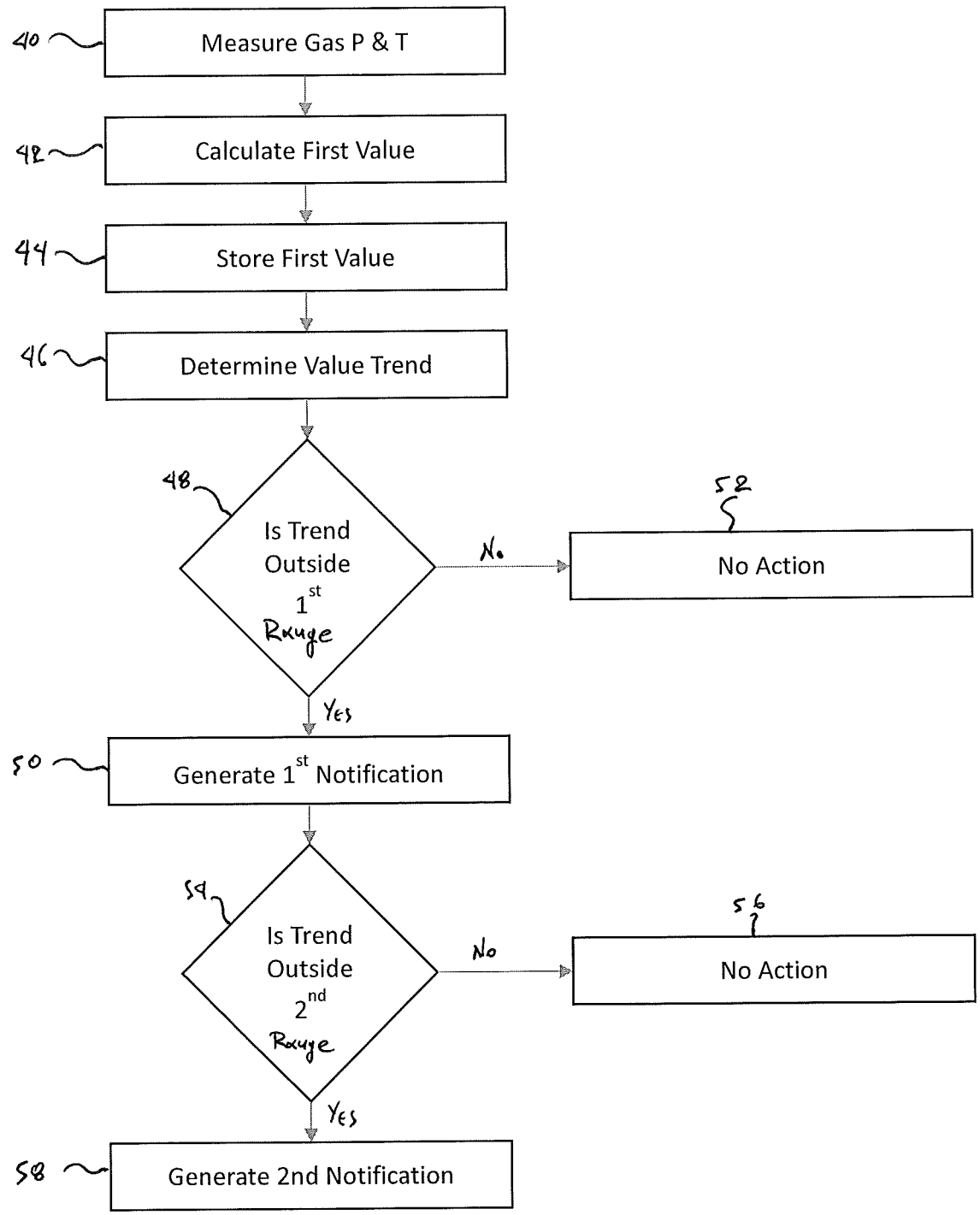
FIG. 4 illustrates a method according to a first aspect of the invention.

FIG. 4 illustrates a flow chart of a method of monitoring the condition of an aircraft landing gear shock absorber according to an embodiment of the present invention. References to the landing gear and gear and shock absorber are to be taken as references to the a landing gear and shock absorber arrangement as previously discussed with respect to FIGS. 1 to 3.

At an initial step 40 the temperature and the pressure of the gas in the shock absorber is measured. Using the measured temperature and pressure a first value is subsequently calculated at step 42. The first value is a temperature-corrected gas pressure value. In other methods according to the invention the first value may be the pressure of the gas as measured. The temperature corrected gas pressure value is then stored at step 44 and subsequently used to determine a gas pressure trend, step 46, based on the plurality of temperature corrected gas pressure values stored in the log. Next, at step 48, it is determined whether the gas pressure trend is outside a first range of values, the first range of values denoting values that indicate that performance of the shock absorber is acceptable or satisfactory. If it is determined that the gas pressure trend is outside the first range of values then a first notification signal is generated, at step 50. Next, at step 54, it is determined whether the gas pressure trend is outside a second range of values, the second range of values denoting values that indicate that performance of the shock absorber is safe but will soon require maintenance. If it is determined that the gas pressure trend is outside the second range of values then a second notification signal is generated, at step 58. If at step 48 it is determined that the gas pressure trend is not outside the first range of values then no further action is taken (step 52). If at step 54 it is determined that the gas pressure trend is not outside the second range of values then no further action is taken (step 56).

Figure 5:
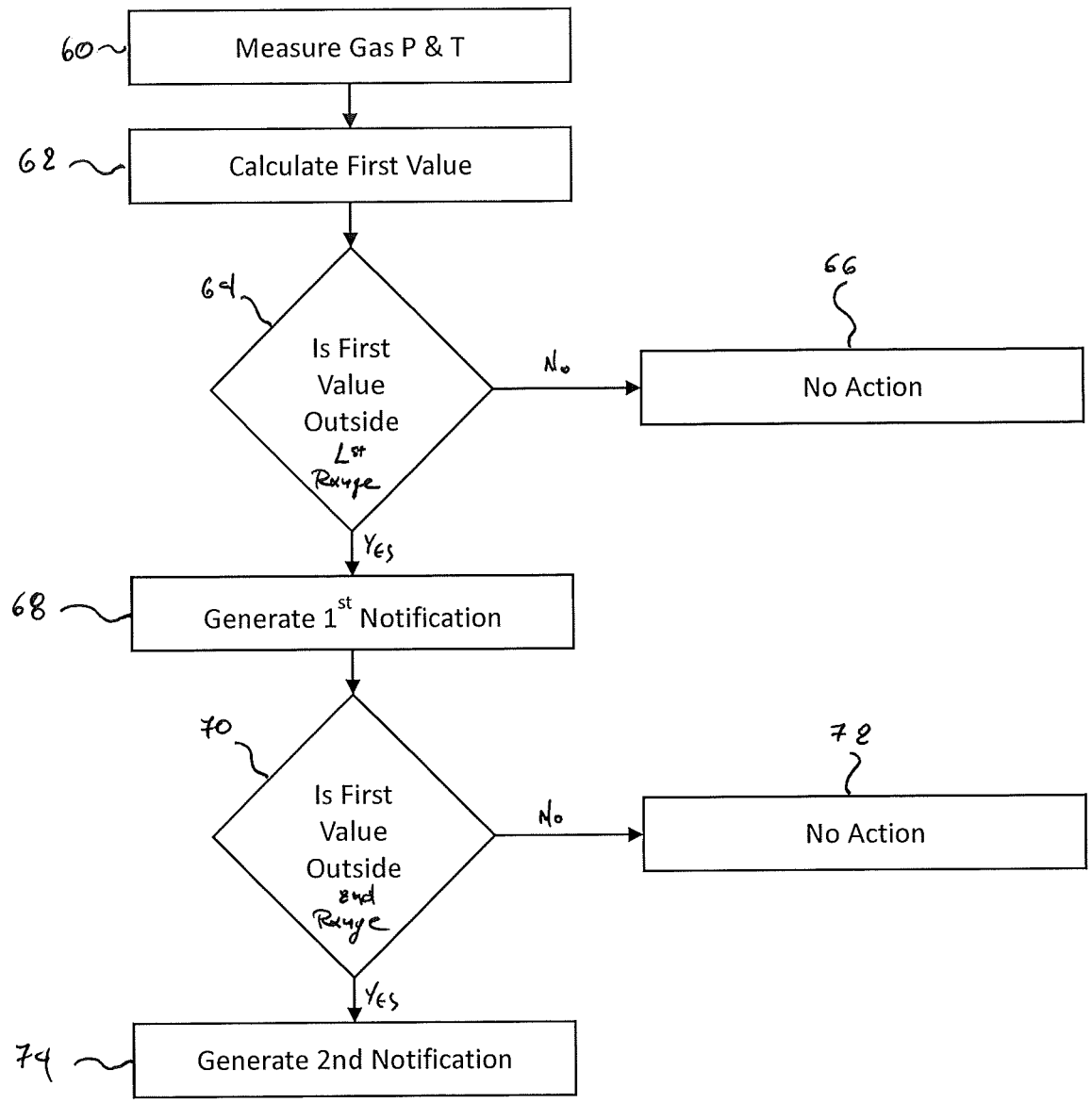
FIG. 5 illustrates a method according to a second aspect of the invention.

FIG. 5 illustrates a flow chart of another method of monitoring the condition of an aircraft landing gear shock absorber according to an embodiment of the present invention. References to the landing gear and gear and shock absorber are again to be taken as references to the a landing gear and shock absorber arrangement as previously discussed with respect to FIGS. 1 to 3.

At an initial step 60 the temperature and the pressure of the gas in the shock absorber is measured. Using the measured temperature and pressure a first value, corresponding to the temperature-corrected gas pressure value is subsequently calculated at step 62. Next, at step 64, it is determined whether the temperature corrected gas pressure value is outside a first range of values, the first range of values denoting values that indicate that performance of the shock absorber is acceptable or satisfactory. If it is determined that the corrected gas pressure value is outside the first range of values then a first warning signal is generated, at step 68. Next, at step 70, it is determined whether the gas pressure value is outside a second range of values, the second range of values denoting values that indicate that performance of the shock absorber is safe but will soon require maintenance. If it is determined that the gas pressure trend is outside the second range of values then a second notification signal is generated, at step 74. If it is determined that the corrected gas pressure value is not outside the first range of values then no further action is taken (step 66). If at step 70 it is determined that the gas pressure trend is not outside the second range of values then no further action is taken (step 72).

Figure 6:
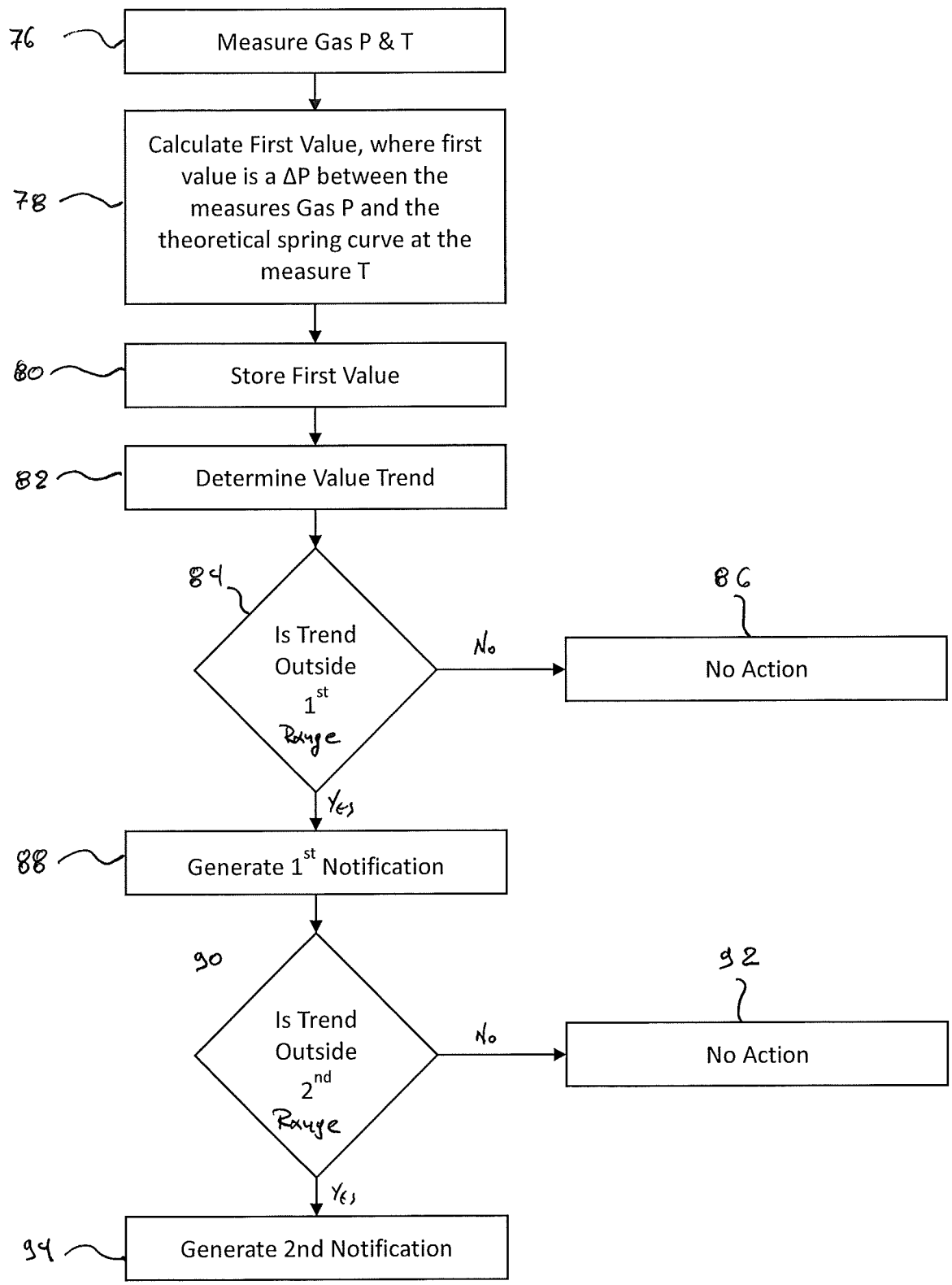
FIG. 6 illustrates a method according to a third aspect of the invention.

FIG. 6 illustrates a flow chart of another method of monitoring the condition of an aircraft landing gear shock absorber according to an embodiment of the present invention. References to the landing gear and gear and shock absorber are again to be taken as references to the a landing gear and shock absorber arrangement as previously discussed with respect to FIGS. 1 to 3.

At an initial step 76 the temperature and the pressure of the gas in the shock absorber is measured. Using the measured temperature and pressure a first value $\Delta P$ is subsequently calculated at step 78. $\Delta P$ can be either the difference between the measured pressure and the expected ideal pressure for that particular temperature, or the difference between the temperature-corrected pressure and a temperature-corrected ideal pressure. The first value $\Delta P$ is then stored at step 80 and subsequently used to determine a $\Delta P$ trend, step 82, based on the plurality of $\Delta P$ values stored in the log. Next, at step 84, it is determined whether the $\Delta P$ trend is outside a first range of values, the first range of values denoting values that indicate that performance of the shock absorber is acceptable or satisfactory. If it is determined that the gas pressure trend is outside the first range of values then a first warning notification signal is generated, at step 88. Next, at step 90, it is determined whether the gas pressure trend is outside a second range of values, the second range of values denoting values that indicate that performance of the shock absorber is safe but will soon require maintenance. If it is determined that the gas pressure trend is outside the second range of values then a second notification signal is generated, at 94 step 58. If at step 84 it is determined that the gas pressure trend is not outside the first range of values then no further action is taken (step 86). If at step 90 it is determined that the gas pressure trend is not outside the second range of values then no further action is taken (step 92).

Figure 7:
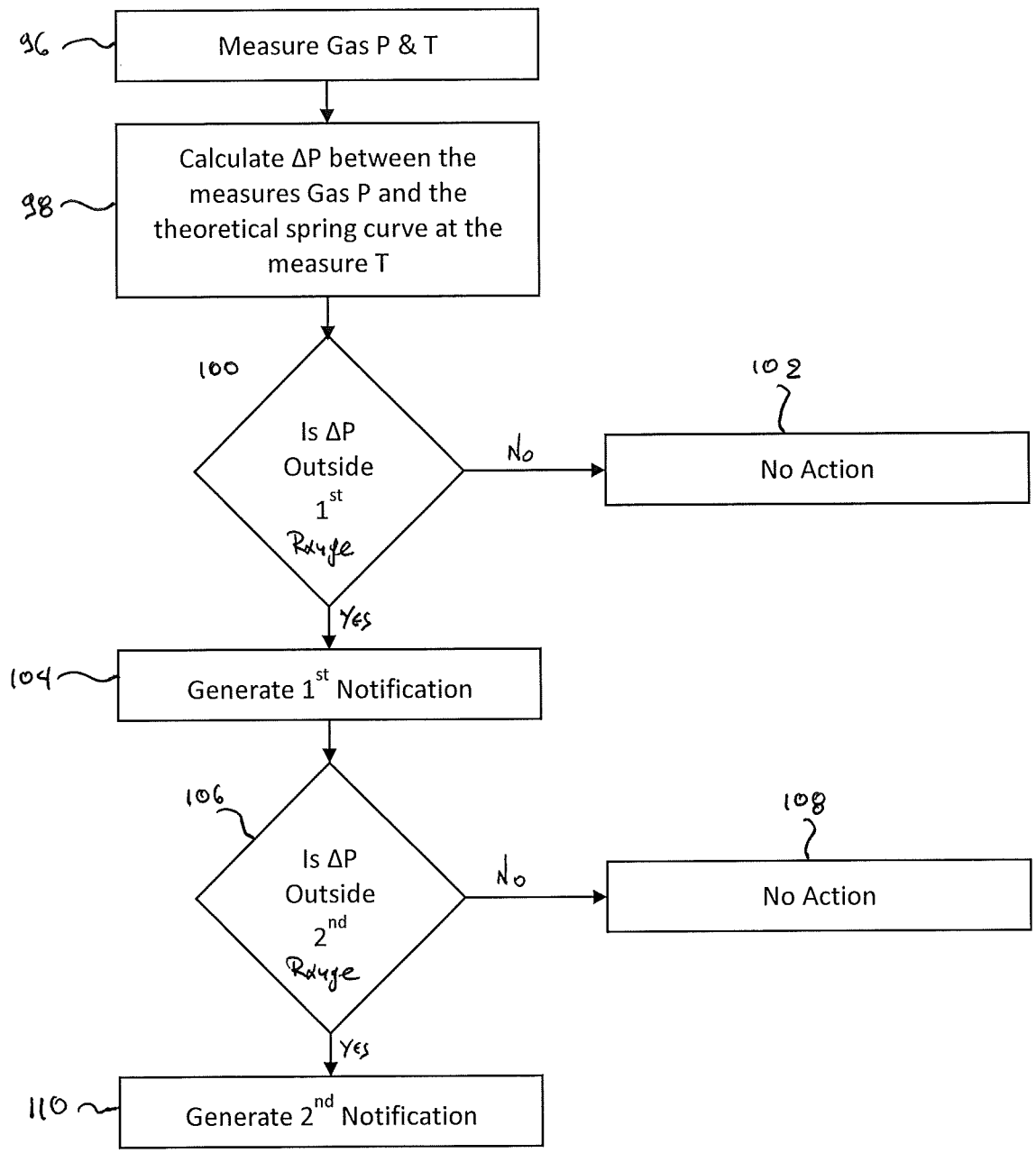
FIG. 7 illustrates a method according to a fourth aspect of the invention.

FIG. 7 illustrates a flow chart of another method of monitoring the condition of an aircraft landing gear shock absorber according to an embodiment of the present invention. References to the landing gear and gear and shock absorber are again to be taken as references to the a landing gear and shock absorber arrangement as previously discussed with respect to FIGS. 1 to 3.

At an initial step 96 the temperature and the pressure of the gas in the shock absorber is measured. Using the measured temperature and pressure a first value $\Delta P$ is subsequently calculated at step 98. $\Delta P$ can be either the difference between the measured pressure and the expected ideal pressure for that particular temperature, or the difference between the temperature-corrected pressure and a temperature-corrected ideal pressure. Next, at step 100, it is determined whether $\Delta P$ is outside a first range of values, the first range of values denoting values that indicate that performance of the shock absorber is acceptable or satisfactory. If it is determined that $\Delta P$ is outside the first range of values then a first notification signal is generated, at step 104. Next, at step 104, it is determined whether $\Delta P$ is outside a second range of values, the second range of values denoting values that indicate that performance of the shock absorber is safe but will soon require maintenance. If it is determined that $\Delta P$ is outside the second range of values then a second notification signal is generated, at step 110. If it is determined that $\Delta P$ is not outside the first range of values then no further action is taken (step 108). If at step 106 it is determined that $\Delta P$ is not outside the second range of values then no further action is taken (step 108).

It will be appreciated however that other methods according to embodiments of the invention can comprise some of the steps, measurements and actions as described above. Furthermore, the previously described sequence of steps does not indicate that some of the steps cannot be performed simultaneously or in different order to the one described.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A method of monitoring a condition of an aircraft landing gear shock absorber, the shock absorber including at least one spring chamber containing a gas, the method comprising:
   taking a plurality of measurements of a gas pressure and a temperature in the spring chamber, each gas pressure and temperature measurement pair being taken at a same instant relative to an operating cycle of the shock absorber;
   determining a first value based on each pair of gas pressure and temperature measurements;
   storing the first value in a log;
   determining a trend of the first values based on the log, the trend indicating a prediction of performance; and
   in response to determining that the trend of the first values is outside a first range of values, generating a first notification signal, wherein measuring the gas pressure and temperature occurs before the aircraft lands.

2. The method of claim 1, further comprising upon determining that the first value or trend of the first values is outside a second range, the second range encompassing the first range, generating a second notification signal in place or in addition to the first notification signal.

3. The method of claim 1, wherein determining the first value comprises calculating a temperature-corrected gas pressure.

4. The method of claim 1, wherein determining the first value comprises calculating a difference between the measured pressure and an expected pressure.

5. The method of claim 1, wherein the first range and/or the second range of values are predetermined.

6. The method of claim 1, wherein the first range and/or the second range of values are determined based on the temperature measurement.

7. The method of claim 1, wherein measuring the gas pressure and temperature occurs when the shock absorber is fully extended.

8. The method of claim 1, wherein measuring the gas pressure and temperature occurs at one of the following: once the aircraft has reached a predetermined altitude; at a predetermined time before landing; in response to extending the landing gear; when the landing gear is in the stowed position; or at a predetermined flight phase.

9. The method of claim 1, wherein the values of gas pressure and temperature are communicated to a computing device outside of an aircraft comprising the aircraft landing gear shock absorber, wherein the computing device calculates the temperature-corrected gas pressure, stores the first value in the log and/or determines the trend of the first values.

10. A system comprising:
    a shock absorber comprising a spring chamber; and
    a sensor configured to measure a temperature and a pressure of a gas in the spring chamber;
    wherein the sensor is arranged to communicate the measurements of the temperature and the pressure of the gas to a computing device configured to:
    take a plurality of measurements of a gas pressure and a temperature in the spring chamber, each gas pressure and temperature measurement pair being taken at a same instant relative to an operating cycle of the shock absorber;
    determine a first value based on each pair of gas pressure and temperature measurements;
    store the first value in a log;
    determine a trend of the first values based on the log, the trend indicating a prediction of performance; and
    in response to determining that the trend of the first values is outside a first range of values, generate a first notification signal, wherein measuring the gas pressure and temperature occurs before the aircraft lands.

11. The system of claim 10, wherein the system is incorporated into an aircraft landing comprising the shock absorber.

* * * * *